United States Patent
Zupancic et al.

(10) Patent No.: US 10,780,368 B2
(45) Date of Patent: Sep. 22, 2020

(54) SUBMERGED COMBUSTION APPARATUS

(71) Applicant: BENETERRA TECHNOLOGIES PTY LTD, Brisbane, Queensland (AU)

(72) Inventors: John William Zupancic, Milton (AU); Anthony William Stapleton, Milton (AU); Adam Lee Zimmer, Milton (AU); Rory Van Niekerk, Milton (AU); Anthony Justin Carroll, Milton (AU); James Joseph Jones, Milton (AU); Scott Peter Kisbee, Milton (AU)

(73) Assignee: BENETERRA TECHNOLOGIES PTY LTD, Brisbane (AT)

( * ) Notice: Subject to any disclaimer, the term of this patent is extended or adjusted under 35 U.S.C. 154(b) by 0 days.

(21) Appl. No.: 16/302,028

(22) PCT Filed: May 17, 2017

(86) PCT No.: PCT/AU2017/050457
§ 371 (c)(1),
(2) Date: Nov. 15, 2018

(87) PCT Pub. No.: WO2017/197454
PCT Pub. Date: Nov. 23, 2017

(65) Prior Publication Data
US 2019/0282918 A1 Sep. 19, 2019

Related U.S. Application Data (60) Provisional application No. 62/338,098, filed on May 18, 2016.

(51) Int. Cl.
*B01D 1/14* (2006.01)
*F24H 1/10* (2006.01)
*C02F 1/04* (2006.01)

(52) U.S. Cl.
CPC ............... *B01D 1/14* (2013.01); *C02F 1/048* (2013.01); *F24H 1/107* (2013.01)

(58) Field of Classification Search
CPC ... B01D 1/14; C02F 1/048; F24H 1/20; F24H 1/205; F24H 1/206; F24H 1/107
(Continued)

(56) References Cited

U.S. PATENT DOCUMENTS 1,716,433 A * 6/1929 Ellis ........................ B01D 1/14
 208/7
2,209,798 A * 7/1940 Subkow ................. B01D 3/148
 208/350

(Continued)

OTHER PUBLICATIONS

Belt. 2019. In Merriam-Webster.com. Retrieved Aug. 12, 2019, from https://www.merriam-webster.com/dictionary/belt (Year: 2019).*

*Primary Examiner* — Jonathan Miller
*Assistant Examiner* — Gabriel E Gitman
(74) *Attorney, Agent, or Firm* — Rimon, P.C.

(57) ABSTRACT

A submerged combustion apparatus for heating a liquid including a liquid vessel that contains the liquid, a combustion chamber including a combustion chamber body, an inlet and a plurality of discharge ports, the combustion chamber body being positioned in the vessel so that at least the discharge ports are submerged in liquid in use, a burner that allows an air/fuel mixture to be burned at least partially within the combustion chamber thereby causing bubbles of heated gaseous combustion products to be emitted from the discharge ports so as to heat the liquid and a guide surface spaced apart from and extending along at least part of a length of a combustion chamber body outer surface so as to guide bubbles emitted from the discharge ports so that the bubbles are at least partially constrained to flow between the combustion chamber body outer surface and the guide surface.

12 Claims, 6 Drawing Sheets

(58) Field of Classification Search
 USPC .......................................................... 159/16.2
 See application file for complete search history.

(56) References Cited

U.S. PATENT DOCUMENTS

| | | | | |
|---|---|---|---|---|
| 4,022,571 | A | * | 5/1977 | Gentry .................... F23L 15/02 432/180 |
| 4,206,711 | A | * | 6/1980 | Konrad .................... F23G 5/12 110/238 |
| 4,643,272 | A | * | 2/1987 | Gaffrig ................ F01N 13/004 181/239 |
| 4,762,004 | A | * | 8/1988 | Lalin ....................... G01F 1/708 73/861.05 |
| 5,082,525 | A | * | 1/1992 | Travis ................ B01D 1/0082 159/16.1 |
| 5,102,583 | A | * | 4/1992 | Bannon .................... B01D 3/18 261/114.1 |
| 5,636,623 | A | | 6/1997 | Panz et al. |
| 6,293,277 | B1 | * | 9/2001 | Panz ....................... F24H 1/107 122/31.2 |
| 6,338,337 | B1 | | 1/2002 | Panz et al. |
| 7,214,290 | B2 | | 5/2007 | Duesel, Jr. et al. |
| 7,416,172 | B2 | * | 8/2008 | Duesel, Jr. ............... B01D 1/14 261/123 |
| 8,852,393 | B2 | | 10/2014 | Panz et al. |
| 8,852,394 | B2 | | 10/2014 | Panz et al. |
| 2002/0088703 | A1 | * | 7/2002 | Walker ................ B01D 1/0094 203/10 |
| 2002/0106597 | A1 | * | 8/2002 | Grando .................. F23D 14/72 431/24 |
| 2004/0089554 | A1 | | 5/2004 | Schepel et al. |
| 2008/0110417 | A1 | * | 5/2008 | Smith .................. B01D 1/0058 122/379 |
| 2012/0067119 | A1 | * | 3/2012 | Cronin .................. G01F 23/164 73/299 |
| 2014/0069590 | A1 | * | 3/2014 | Lim ......................... B01D 1/26 159/17.1 |

\* cited by examiner

Fig. 3A

SUBMERGED COMBUSTION APPARATUS

CROSS-REFERENCE TO RELATED APPLICATIONS

This application is a United States national stage entry of an International Application serial no. PCT/AU2017/050457 filed May 17, 2017 which claims priority to U.S. Provisional Patent Application Ser. No. 62/338,098 filed May 18, 2016. The contents of these applications are incorporated herein by reference in their entirety.

BACKGROUND OF THE INVENTION

The present invention relates to a submerged combustion apparatus for use in heating a liquid, for example to reduce the volume of a liquid through evaporation, concentrate a liquid solution, raise a liquid temperature, fractionate a mixed salt solution, volatilize constituents like ammonia, or the like.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavor to which this specification relates.

In many industrial processes waste water, such as salt solutions, are produced in large volumes. Disposal of such solutions can be problematic, and typical solutions include storing the water in temporary reservoirs until the liquid has evaporated, allowing the remaining solid precipitate to be treated or disposed. Such approaches can be problematic however as this results in the need to store, dispose and/or transport large volumes of solution.

One approach to this is to heat the solutions using submerged combustion, in order to increase the rate of evaporation, achieve a targeted solution concentration and reduce the volume of liquid to be stored or disposed.

U.S. Pat. No. 5,636,623 describes a method and apparatus for minimizing turbulence in a submerged combustion system. The submerged combustion system can be installed singly or in combination with other similar submerged combustion systems to heat large quantities of liquids and solutions. The invention is directed to a submerged combustion system wherein hot products of combustion are forced through a solution to heat the solution, the hot combustion products being created by burning a fuel with air in the interior of a retaining means, and the hot gaseous products of combustion being exhausted from the interior of the retaining means into the solution, the improvement comprising exhausting the hot gaseous products of combustion through a first port at a predetermined elevation below the level of the solution, the size of the port being predetermined to minimize foam being created at the surface of the solution.

U.S. Pat. No. 6,293,277 describes a two-stage heat recovery submerged combustion heating system. More particularly, this invention relates to a novel submerged combustion heating system with a lowered self-cooling combustion chamber and a two stage heat recovery system. The system can be installed singly or in combination with other similar submerged combustion systems to heat large quantities of liquids and liquid-solid solutions.

U.S. Pat. No. 6,338,337 describes a submerged combustion heating system with a lowered self-cooling combustion chamber and a two stage heat recovery system. The system can be installed singly or in combination with other similar submerged combustion systems to heat large quantities of liquids and liquid-solid solutions.

U.S. Pat. No. 8,852,393 describes apparatus for evaporating waste water having dissolved solids therein comprising a holding vessel having an inlet for receiving waste water, a submerged combustion chamber with burner suspended within the holding vessel, the submerged combustion chamber having a plurality of vertical slots defined therein near a bottom thereof which span a substantial portion of a height of the submerged combustion chamber, a blower connected to provide air under positive pressure to the burner, and, a vent stack coupled to an upper portion of the holding vessel for allowing water vapor to exit the holding vessel.

U.S. Pat. No. 8,852,394 describes apparatus for evaporating waste water having chemicals therein which cause foaming comprising a holding vessel having an inlet for receiving waste water, one or more submerged combustion chambers with burners suspended within the holding vessel, and, one or more foam skimming weirs located in an upper portion of the holding vessel, the one or more foam skimming weirs defining one or more foam collection zones.

SUMMARY OF THE PRESENT INVENTION

In one broad form the present invention seeks to provide a submerged combustion apparatus for heating a liquid, the apparatus including: a liquid vessel that contains the liquid, the liquid vessel having: a vessel inlet that receives liquid from a liquid supply; and, a vessel outlet that discharges liquid and any precipitates; a combustion chamber including: a combustion chamber body; an inlet proximate a first end of the combustion chamber body; and a plurality of discharge ports proximate a second end of the combustion chamber body, wherein the combustion chamber body is positioned in the vessel so that at least the discharge ports are submerged in liquid in use; and, a burner having: a burner air inlet that receives pressurized air from an air supply; a fuel inlet that receives a fuel from a fuel supply; and, a burner outlet in fluid communication with the combustion chamber allowing an air/fuel mixture to be burned at least partially within the combustion chamber thereby causing bubbles of heated gaseous combustion products to be emitted from the plurality of discharge ports so as to heat the liquid; and, a guide surface spaced apart from and extending along at least part of a length of a combustion chamber body outer surface so as to guide bubbles emitted from the plurality of discharge ports so that the bubbles are at least partially constrained to flow between the combustion chamber body outer surface and the guide surface.

In one embodiment the guide surface is at least one of: a wall of the liquid vessel; and, a wall of a baffle positioned within the liquid vessel.

In one embodiment the guide surface is spaced apart from the combustion chamber body outer surface by at least one of: between 50 mm and 400 mm; between 100 mm and 200 mm; 100 mm±50 mm; 150 mm±50 mm; and, 200 mm±50 mm.

In one embodiment the guide surface extends from at least a liquid surface level to a level positioned below the plurality of discharge ports.

In one embodiment the guide surface and combustion chamber body outer surface are arranged so that the flow of bubbles is at least partially constrained between the two surfaces.

In one broad form the present invention seeks to provide a submerged combustion apparatus for heating a liquid, the apparatus including: a liquid vessel that contains the liquid, the liquid vessel having: a vessel inlet that receives liquid from a liquid supply; and, a vessel outlet that discharges liquid and any precipitates; a combustion chamber including: a combustion chamber body; an inlet proximate a first end of the combustion chamber body; and a plurality of discharge ports proximate a second end of the combustion chamber body, wherein the combustion chamber body is positioned in the liquid vessel so that at least the outlet discharge ports are submerged in liquid in use; and, a burner having: a burner air inlet that receives pressurized air from an air supply; a fuel inlet that receives a fuel from a fuel supply; and, a burner outlet in fluid communication with the combustion chamber allowing an air/fuel mixture to be burned at least partially within the combustion chamber thereby causing bubbles of heated gaseous combustion products to be emitted from the plurality of discharge ports so as to heat the liquid; and, wherein the liquid vessel includes a sloped base surface defining a sump and wherein the vessel outlet is proximate the sump so as to facilitate removal of liquid and any precipitates.

In one embodiment the sloped base surface is curved so as to funnel any precipitates to the outlet.

In one embodiment the outlet includes an outlet valve to control outflow of liquid and any precipitates from the liquid vessel.

In one embodiment the outlet is positioned in a substantially vertical face of the sloped base so that liquid and any precipitates flow into the outlet in a direction substantially perpendicular to a plane of the outlet.

In one embodiment the sloped surface slopes downwardly from under the combustion chamber to the outlet to thereby induce flow of liquid and any precipitates from a region under the combustion chamber towards the outlet.

In one broad form the present invention seeks to provide a submerged combustion apparatus for heating a liquid, the apparatus including: a liquid vessel that contains the liquid, the liquid vessel having: a vessel inlet that receives liquid from a liquid supply; and, a vessel outlet that supplies liquid and any precipitates; a combustion chamber including: a combustion chamber body; an inlet proximate a first end of the combustion chamber body; and one or more openings proximate a second end of the combustion chamber body; a discharge port member mounted proximate the second end of the combustion chamber body so as to cover the openings, the discharge port member including a number of apertures in fluid communication with the openings to define a plurality of discharge ports and wherein the combustion chamber body is positioned in the liquid vessel so that at least the discharge ports are submerged in liquid in use; and, a burner having: a burner air inlet that receives pressurized air from an air supply; a fuel inlet that receives a fuel from a fuel supply; and, a burner outlet in fluid communication with the combustion chamber allowing an air/fuel mixture to be burned at least partially within the combustion chamber thereby causing bubbles of heated gaseous combustion products to be emitted from the plurality of discharge ports so as to heat the liquid.

In one embodiment the discharge port member is a discharge port belt that extends circumferentially around a combustion chamber outer surface proximate the second end.

In one embodiment the discharge port belt is clamped into engagement with the combustion chamber body.

In one broad form the present invention seeks to provide a submerged combustion apparatus for heating a liquid, the apparatus including: a liquid vessel that contains the liquid, the liquid vessel having: a vessel inlet that receives liquid from a liquid supply; and, a vessel outlet that discharges liquid and any precipitates; a combustion chamber including: a combustion chamber body; an inlet proximate a first end of the combustion chamber body; and a plurality of discharge ports proximate a second end of the combustion chamber body, wherein the combustion chamber body is positioned in the liquid vessel so that at least the outlet discharge ports are submerged in liquid in use; and, a burner having: a burner air inlet that receives pressurized air from an air supply; a fuel inlet that receives a fuel from a fuel supply; and, a burner outlet in fluid communication with the combustion chamber allowing an air/fuel mixture to be burned at least partially within the combustion chamber thereby causing bubbles of heated gaseous combustion products to be emitted from the plurality of discharge ports so as to heat the liquid; and, at least one sensor that senses an operating parameter; and, a controller that in use at least partially controls operation of the apparatus in accordance with the at least one operating parameter.

In one embodiment the at least one sensor includes at least one of: a density sensor that senses a density of liquid in the liquid vessel; a level sensor that senses a level of liquid in the liquid vessel; a temperature sensor that senses a temperature of liquid in the liquid vessel; a temperature sensor that senses a combustion exhaust temperature; and, an $O_2$ sensor that senses an $O_2$ level in the gaseous combustion products.

In one embodiment the density meter includes first and second pressure sensors provided at respective levels within the liquid vessel, and wherein the controller determines a liquid density based on a difference in pressure sensed by the first and second pressure sensors.

In one embodiment the level sensor includes at least one pressure sensor, and wherein the controller determines a liquid level based on a pressure sensed by the pressure sensor.

In one embodiment the controller controls at least one of: an inflow rate of liquid into the liquid vessel; and, an outflow rate of liquid and any precipitates.

In one embodiment the controller selectively controls at least one of: an outflow rate of liquid to maintain a target liquid density; and, an inflow rate of liquid to maintain a target liquid level.

In one embodiment the controller controls a degree of combustion.

In one embodiment a degree of combustion is controlled by controlling at least one of: a pressurized air inflow rate; a fuel inflow rate; and, an air/fuel mixture ratio (AFR).

In one embodiment a degree of combustion is controlled in accordance with at least one of: a calibration process; a calculated air/fuel equivalency ratio (AFER); an $O_2$ level in the gaseous combustion products; and, a temperature sensor within the combustion chamber.

In one embodiment the controller controls the apparatus to provide substantially continuous operation.

In one embodiment the controller controls an inflow rate of liquid into the liquid vessel in accordance with an outflow rate of liquid and a rate of vaporization of liquid in the liquid vessel.

In one broad form the present invention seeks to provide a submerged combustion system for heating a liquid, the system including: a plurality of combustion apparatuses, each apparatus including: a liquid vessel that contains the liquid, the liquid vessel having: a vessel inlet that receives liquid from a liquid supply; and, a vessel outlet that supplies liquid and any precipitates; a combustion chamber including: a combustion chamber body; an inlet proximate a first end of the combustion chamber body; and a plurality of outlet discharge ports proximate a second end of the combustion chamber body, wherein the combustion chamber body is positioned in the liquid vessel so that at least the outlet discharge ports are submerged in liquid in use; and, a burner having: a burner air inlet that receives pressurized air from an air supply; a fuel inlet that receives a fuel from a fuel supply; and, a burner outlet in fluid communication with the combustion chamber allowing an air/fuel mixture to be burned at least partially within the combustion chamber thereby causing bubbles of heated gaseous combustion products to be emitted from the plurality of discharge ports so as to vaporize liquid; and, an air supply that supplies pressurized air to each burner inlet via a manifold; and, a controller that in use at least partially controls operation of each apparatus.

In one embodiment the apparatus is used for at least one of: heating a liquid; evaporating a liquid; concentrating a liquid and, volatilizing constituents. It will be appreciated that the broad forms of the invention and their respective features can be used in conjunction, interchangeably and/or independently, and reference to separate broad forms is not intended to be limiting.

BRIEF DESCRIPTION OF THE DRAWINGS

An example of the present invention will now be described with reference to the accompanying drawings, in which:—

DETAILED DESCRIPTION OF THE PREFERRED EMBODIMENTS

An example of a submerged combustion apparatus, also referred to as a direct contact heat exchanger, will now be described with reference to FIGS. 1A and 1B.

For the purpose of illustration it will be assumed that the submerged combustion apparatus is used for heating a liquid, for example to reduce the volume of the liquid through evaporation, and in one particular example for evaporatively concentrating (evapoconcentration) a liquid solution, although the system could also be used for volatilizing constituents of a liquid, such as ammonia. The nature of the liquid will vary depending upon the intended use of the apparatus, and could include any liquid, such as solutions including one or more solutes dissolved in a suitable solvent, including but not limited to brines formed from one or more salts dissolved in water. Such brines are typically created during industrial processes, such as mining or water purification and there is a need to reduce the volume of the brine for storage or transport purposes. This can also be used for disposal purposes, for example to reduce the volume of a solution or other liquid prior to injection into a subsurface injection well.

It will be appreciated from this that the apparatus can be used for a wide range of other purposes, including but not limited to general liquid heating applications, for example pre-heating liquids for use in downstream industrial processes, heating snow or other solids to liquefy them, reducing the volume of liquids through evaporation, or fractionating dissolved materials, such as salts, as will be described in more detail below.

Where applicable, throughout the following description, the term "liquid solution" is used to refer to a liquid solvent including one or more solids dissolved therein. The term "liquid solution concentrate" is used to refer to a concentrate of the liquid solution, and could be a liquid solution having a higher concentration of solute than the original liquid solution up to and including the saturation point of the liquid solution. Alternatively, the liquid solution concentrate could include solid products, such as salt precipitates, depending on the preferred implementation.

However, it will also be appreciated from the following description that it is not essential that the submerged combustion apparatus is used for concentrating a solution, and indeed the combustion apparatus could be used to heat or evaporate any liquid, including but not limited to any liquid solution. Reference to the terms "liquid solution" and "liquid solution concentrate", will therefore be understood to be illustrative and exemplary, but not necessarily restrictive.

In these examples, the submerged combustion apparatus 100 includes a liquid vessel 110 that contains a liquid S to be concentrated. The liquid vessel 110 typically includes a vessel body having vessel side walls 111.1 extending between a vessel lid 111.2 and vessel base 111.3. In one example the vessel body has a generally cylindrical shape, but this is not essential and other shapes could be used.

The liquid vessel 110 includes a vessel inlet 112 that receives liquid from a liquid supply (not shown), such as a temporary storage reservoir or the like. The vessel inlet 112 is typically arranged to supply liquid to an upper part of the liquid vessel, and can be provided in the vessel lid 111.2, or an upper portion of the vessel side walls 111.1, depending on the preferred implementation.

The liquid vessel 110 also includes a vessel outlet 113 that supplies a liquid, such as a liquid concentrate and any precipitates. The vessel outlet 113 is typically provided proximate the base 111.3 of the liquid vessel 110, to facilitate removal of the liquid, as will be described in more detail below.

The combustion apparatus 100 also includes a combustion chamber 120. The combustion chamber 120 includes a combustion chamber body 121 having an inlet 122 provided proximate a first end and a plurality of discharge ports 123 provided proximate a second end. The combustion chamber body 121 typically has a generally cylindrical shape and may be flared outwardly from the inlet 122, to aid combustion. The discharge ports 123 are generally in the form of generally circular apertures, circumferentially spaced around the second end of the combustion chamber body, although other arrangements could be used. The size, shape and spacing of the discharge ports can be selected to provide desired characteristics to the resulting bubbles produced following combustion.

In use the combustion chamber body is positioned in the liquid vessel 110 so that at least the discharge ports 123 are submerged in liquid in use. In particular, the combustion chamber body 121 is generally orientated substantially vertically, so that the inlet 122 is provided substantially directly above the second end, although this is not essential and other orientations could be used. Additionally whilst the second end is closed in this example, this is not essential and open ended chambers could be used.

The submerged combustion apparatus further includes a burner 130 having a burner air inlet 131 that receives pressurized air from an air supply, and a fuel inlet 132 that receives fuel from a fuel supply. The nature of the fuel can vary depending on the preferred implementation, and could include gaseous or liquid fuels, such as liquid propane gas (LPG), fuel oil, methane, natural gas or the like.

The burner includes a burner outlet (not shown) in fluid communication with the combustion chamber, allowing a fuel-air mixture to be burned within the combustion chamber. In particular, burning of the fuel-air mixture causes bubbles of heated gaseous combustion products to be emitted from the plurality of discharge ports 123. The heated gaseous combustion products typically have a temperature well in excess of 1000° C. and accordingly, operate to vaporize liquid in the vessel 110 as the bubbles come into contact with the liquid. The vaporized liquid is then entrained in the bubbles, and removed from the liquid vessel via an exhaust or other similar outlet, whilst precipitate of the solute tends to re-dissolve into the liquid, thereby increasing the solution concentration, or fall to the vessel base if the solution is already saturated.

Accordingly, it will be appreciated that the above described arrangement provides a submerged combustion apparatus suitable for heating for example to vaporize liquids and in particular concentrate liquid solutions by vaporizing a liquid solvent.

A number of specific features of the submerged combustion apparatus will now be described. It will be appreciated that whilst these additional features are described collectively in particular submerged combustion apparatus arrangements, this is not essential, and any one or more of these could be used to enhance the apparatus features described above.

In one broad form the submerged combustion apparatus includes a guide surface spaced apart from and extending along at least part of a length of an outer surface of the chamber body 121.

Figure 1A:
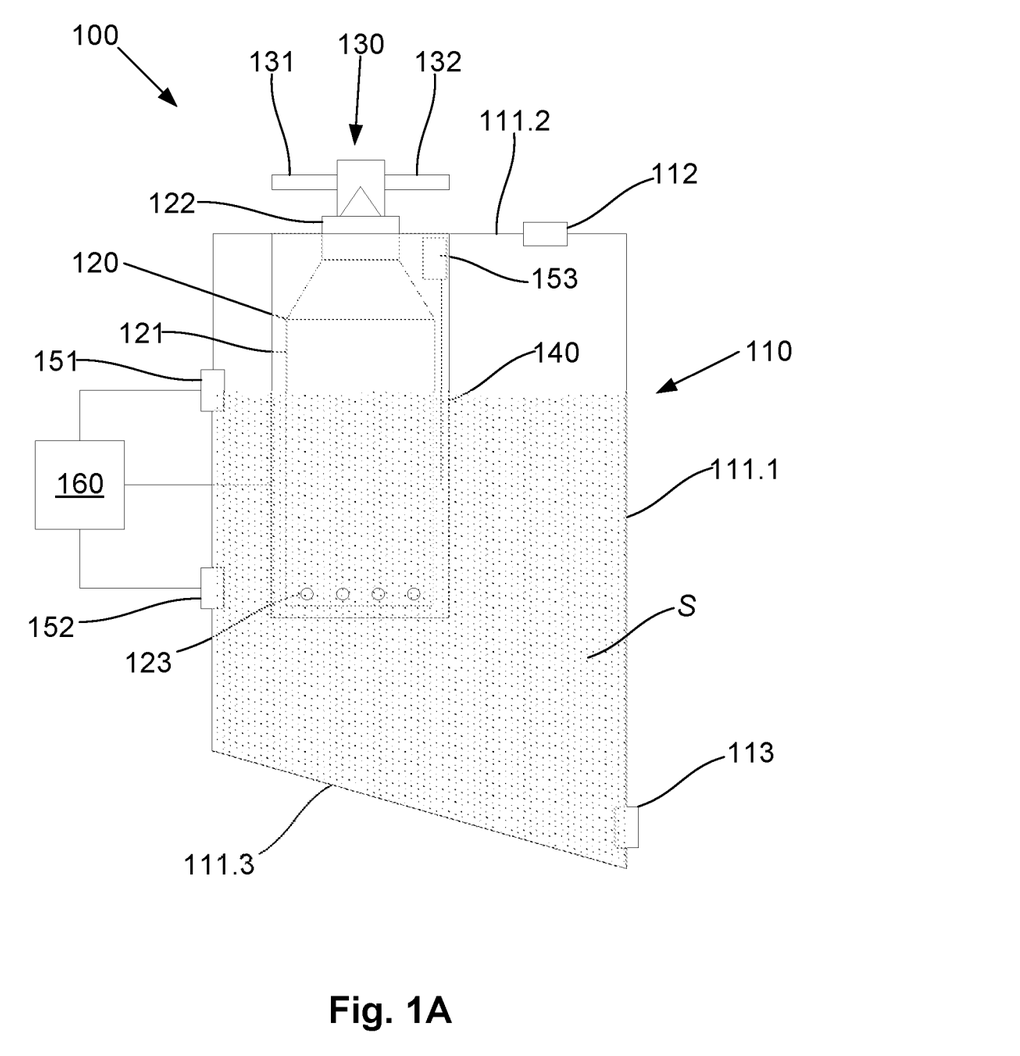
FIG. 1A is a schematic side view of a first example of a submerged combustion apparatus.

In the example of FIG. 1A, the guide surface is formed from a baffle 140 surrounding the combustion chamber body 121. The baffle 140 extends from at least level with, optionally a point below the discharge ports 123, to at least above a liquid level in the liquid vessel 110, and optionally to the lid 111.2 of the liquid vessel 111, in which case a region internal of the baffle can be provided in communication with an exhaust for emission of the gaseous combustion products, and any vaporized liquid entrained therein.

As a result of this configuration, the guide surface is arranged so as to guide bubbles emitted from the plurality of discharge ports so that the bubbles are at least partially constrained to flow between the chamber body outer surface and the guide surface. This arrangement produces a number of beneficial effects.

Firstly, constraining the bubbles to move between the guide surface and the combustion chamber body prevents bubbles being distributed more widely within the liquid vessel. Concentrating the bubbles between the combustion chamber outer surface and the guide surface leads to a higher bubble to water ratio in this region. As the bubbles cause heating and vaporization of water, this leads to an increase in heating and vaporization. Additionally, the bubbles carry pockets of vaporized liquid directly upward to the liquid surface in the liquid vessel. As the bubbles are constrained and hence move to the surface faster, without being distributed widely through the holding vessel, this leads to an increase in evaporation rate.

Additionally, the upwards flow of bubbles and liquid keeps the combustion chamber body cool in comparison to the combustion flame and protects the integrity of the combustion chamber body. In particular, the flow of bubbles and solution draws cooler water into the region between the combustion chamber and the guide surface, which helps to cool the combustion chamber surface, preventing this overheating and damaging the combustion chamber, whilst also allowing combustion to occur at a higher temperature than would otherwise be the case.

Constraining the flow of bubbles also prevents these flowing directly outwards into the vessel, which can lead to vibrations as bubbles collapse and/or impact on the side of the vessel, which can in turn lead to harmonic oscillations and rocking of the vessel.

Accordingly, it will be appreciated that the provision of a guide surface spaced from the combustion chamber body which constrains the flow of bubbles can lead to an increase in the efficiency of the combustion chamber apparatus and in particular, increase the amount of vaporization that is achieved for a given level of combustion, as well as prolonging the lifespan of the apparatus by reducing potential destabilization of the vessel and cooling the combustion chamber thereby prolonging its integrity.

Figure 1B:
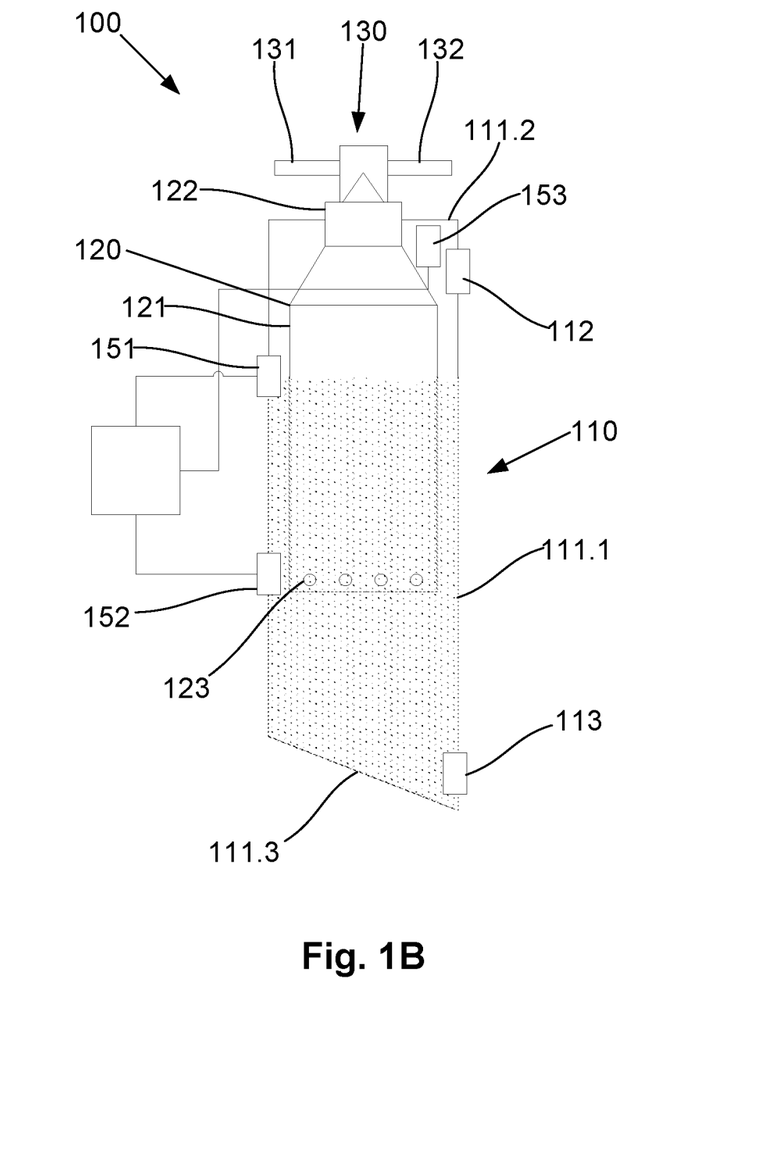
FIG. 1B is a schematic side view of a second example of a submerged combustion apparatus.

In the example of FIG. 1A the guide surface is formed from a baffle (also referred to as a shroud), but it will be appreciated that this is not essential, and as an alternative the guide surface can be formed from side walls 111.1 of the liquid vessel 110, as shown in FIG. 1B, or through a combination of vessel side walls and baffles.

Whilst the position and arrangement of the guide surface can vary, generally the guide surface is spaced apart from the chamber body surface by between 50 mm and 400 mm, and more typically between 100 mm and 200 mm, 100 mm±50 mm, 150 mm±50 mm or 200 mm±50 mm. In the current examples, the guide surface is generally parallel to the combustion chamber outer surface, although this is not essential, and the spacing may vary along the length of the guide surface, as long as bubble flow is still constrained.

Additional modification of bubble flow can be achieved through the introduction of additional features, such as baffles, flow paths defined in the combustion chamber body outer surface or guide surface, or the like.

In another broad form, the submerged combustion apparatus can include a vessel configured to facilitate removal of liquid and in particular liquid concentrate including any precipitates.

In this regard, the vessel includes a sloped base surface 111.3 defining the sump, with the vessel outlet 113 being positioned proximate the sump so that liquid is extracted from substantially a lowest point of the liquid vessel.

It will be appreciated that removal from a lowest point in the vessel allows fluid to be removed using gravity, allowing pumping to be avoided. Additionally, with this arrangement, as vaporization occurs this leads to precipitation of solids from within the liquid, with the precipitate falling towards the bottom of the vessel. Removing liquid from the sump allows precipitate in the sump to be easily removed, for example allowing this to be entrained with liquid as this is removed from the vessel. Any remaining precipitate after the vessel has been drained can be removed by flushing with a supersaturated solution, or the like, which can be performed continuously or intermittently in short surges.

Allowing liquid to be removed progressively from the liquid vessel, whilst new liquid is introduced into the liquid vessel, allows for continuous processing of the liquid. For example, when reducing the volume of a liquid solution, this allows liquid concentrate having a desired concentration to be removed, with new liquid replenishing the levels of liquid in the vessel, without impacting on the concentration of the removed concentrate.

In addition to allowing the liquid to be drained from the sump, the provision of a sloped base surface also assists in inducing flow of fluid towards the outlet, thereby facilitating removal of any precipitates. In this regard, whilst the slope can have any suitable gradient, it has been found that a gradient of between 10° and 20° and more 15°±2° is particularly suitable.

In order to further assist in precipitate removal, the sloped base surface can be curved so as to funnel liquid to the outlet. The outlet can also be provided laterally offset from the combustion chamber, with the base sloping downwardly from under the combustion chamber to the outlet to thereby induce flow of liquid and hence precipitate from a region under the combustion chamber towards the outlet. The outlet can also be positioned in a substantially vertical face of the sloped base, facing the slope, so that liquid flows into the outlet in a direction substantially perpendicular to a plane of the outlet, helping entrained precipitate to be removed.

In another broad form the apparatus can include discharge ports that can be configured through the use of a discharge port member attached to the combustion chamber body 121. In particular this arrangement can be used to replace discharge ports, in the event these become blocked or otherwise damaged, or to change a configuration, shape or number of discharge ports to optimize discharge of the combustion gases. An example of such an arrangement will now be described in more detail with reference to FIGS. 1C and 1D.

Figure 1C:
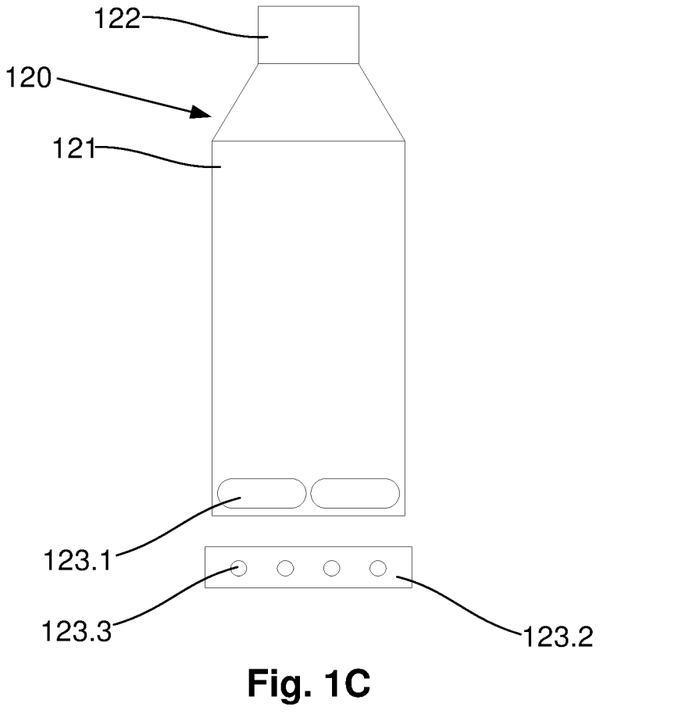
FIG. 1C is a schematic side view of the combustion chamber of FIG. 1A with a discharge port member removed.
Figure 1D:
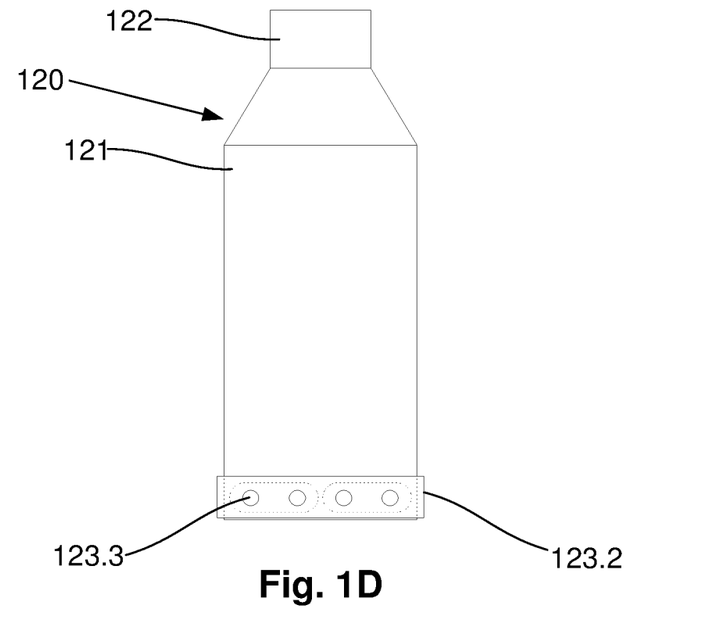
FIG. 1D is a schematic side view of the combustion chamber vessel of FIG. 1C with the discharge port member attached.

In this example, the combustion chamber body 121 includes one or more openings 123.1 proximate a second end of the combustion chamber body. The openings can be of any suitable shape and are designed to provide a substantially open circumferential section near the second end of the combustion chamber. A discharge port member 123.2 is provided which in use is mounted proximate the second end of the combustion chamber body so as to at least partially cover the openings 123.1. The discharge port member includes a number of apertures 123.3 which are provided in fluid communication with the openings 123.1 so that the openings and apertures thereby cooperate to define the plurality of discharge ports.

The discharge port member 123.2 can be of any suitable form, and in one example can be formed from a band or belt, such as a steel band, extending circumferentially around the combustion chamber outer surface. The discharge port member can be attached to the combustion chamber body using any suitable attachment technique, such as bonding, welding, clamping or the like. In one particular example, the belt is clamped by constricting the length of the belt so that it grips the outer surface of the combustion chamber body. It will be appreciated that this allows the discharge port belt to be easily removed, allowing discharge ports to be replaced, and allowing different discharge port arrangements, such as different sizes, shapes or numbers of discharge ports to be used, depending on the preferred implementation. However, it will be appreciated that other configurations could be used. For example, the discharge port member could include one or more plates that are bolted or otherwise fastened to the combustion chamber body, and use of a belt, whilst particularly convenient, is not essential.

In another broad form the submerged combustion apparatus can be provided with one or more sensors and a controller, allowing the combustion process to be controlled in a substantially automated fashion to optimize the combustion process, and allow for continuous operation.

In this example, the submerged combustion apparatus includes at least one sensor 151, 152, 153 that senses an operating parameter and a controller 160 that in use at least partially controls operation of the apparatus in accordance with the at least one operating parameter.

In particular, the use of sensors and controllers allows the operation of the submerged combustion apparatus 100 to be controlled substantially automatically, for example to control the inflow of liquid, the outflow of liquid, or operation of the burner, with this being performed in one example to allow continuous operation. In this regard, during such continuous operation, an inflow rate of liquid into the vessel is controlled to maintain a target liquid level, whilst an outflow rate of liquid is controlled so as to maintain a desired characteristic of the removed liquid, such as a target liquid temperature or liquid solution concentration.

Thus, controlling inflow of fluid to maintain a desired liquid level within the liquid vessel, whilst extracting liquid based on a measured liquid characteristic allows continuous operation and hence avoids the need to perform batch processing of solution as is the case in traditional arrangements.

The nature of the sensor can vary depending upon the operating parameter to be sensed but could include a level sensor 151 that senses a level of liquid in the vessel or a density sensor 152 that senses a density of liquid in the vessel. In this regards, the density of the liquid can be used as a surrogate for other characteristics of the liquid, such as a liquid solution concentration, allowing this to be derived based on measurements of density. Alternatively, other characteristics could be measured, such as a liquid temperature, to determine if a desired amount of heating has been performed, or a liquid conductivity, to determine a measure of concentration of a liquid solution. Additionally, an $O_2$ sensor 153 can be provided either in the combustion chamber or in or adjacent to a gaseous outlet of the vessel, that senses an $O_2$ level in the gaseous combustion products. A temperature sensor could additionally or alternatively be provided within the combustion chamber.

The nature of the controller 160 will vary depending on the preferred implementation, but typically the controller includes an electronic processing device that is capable of receiving signals from one or more sensors, and implementing control instructions, allowing for appropriate control of the apparatus to be performed.

In one example, the controller 160 includes a processing system including an electronic processing device, such as a computer system, a microprocessor, microchip processor, logic gate configuration, firmware optionally associated with implementing logic such as an FPGA (Field Programmable Gate Array), PLC (Programmable Logic Controller) or any other electronic device, system or arrangement. The controller can further include an interface, such as a Human Machine Interface (HMI), allowing an operator to interact with the controller to control respective settings and/or monitor operation of the submerged combustion apparatus. The interface could also be adapted for communication with other processing systems, such as remote computer systems, to allow for remote monitoring and control. It will be appreciated from this that the controller 160 allows full automation and remote monitoring and control of the submerged combustion unit.

An example of the process of controlling the submerged combustion apparatus will now be described. In this regard, the controller 160 can operate a number of different control processes in parallel, in order to control aspects of operation, such as the outflow of liquid, the inflow of liquid and operational parameters of the burner. Each of these will now be described.

In terms of the outflow of liquid, this is typically performed in order to control a desired characteristic of the removed liquid, such as a concentration of a resulting liquid solution concentrate, temperature of heated liquid or the like. In the case of the concentration of a liquid solution, the concentration is directly linked to the density of the liquid, and hence the controller operates to control the outflow of liquid in accordance with a target density, so that the density acts as a surrogate for concentration, as will now be described with reference to FIG. 2A.

Figure 2A:
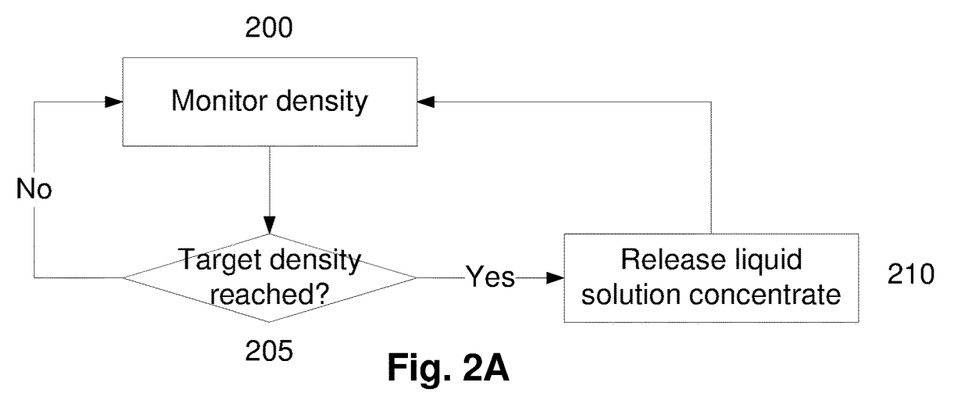
FIG. 2A is a flowchart of an example of an outflow control process for a submerged combustion apparatus.

In this example, at step 200 the controller 160 operates to monitor the density of the liquid in the vessel using signals from the density sensor 152. The controller compares the measured density to a target density to determine if the target density has been reached at step 205. If it is determined that a desired target density is reached, then at step 210, the controller causes liquid to be released from the outlet 113, for example by opening a suitable valve or the like, as will be described in more detail below. The release of liquid is controlled, for example to allow a predetermined amount of liquid to be released, or to release liquid with a constant or controlled flow rate. As a further alternative liquid can be released until the density, and hence concentration, falls below the target amount, or until a liquid temperature falls below a desired level. This is repeated continuously, allowing liquid having desired characteristics to be removed. In one example, this control takes place within the set point of the Lo-Lo safety level of the vessel.

For example, the target density can be defined based on a particular target concentration for the liquid being removed. This can be performed to maximize the concentration, to reach a saturation point of the liquid, or to reduce the liquid to a specific volume. However, the target concentration can also be defined based on the evaporation characteristics of the liquid, and more specifically the colligative properties of the solution. In this regard, the amount of evaporation achieved for a given amount of combustion will typically vary depending on a range of factors such as a vapor pressure, barometric pressure, temperature, liquid solution concentration, or the like. When a solution is heated, there is an initial increase in temperature, with the concentration and hence density increasing as liquid evaporates. Once the liquid solution reaches a sufficiently high concentration a precipitate forms, at which point the temperature and concentration plateau as more liquid is vaporized and more precipitate forms. Once the respective solute has precipitated a further increase in temperature and concentration occurs. As different salt species will precipitate out under different conditions this provides a mechanism to allow different salts to be separated from a solution through fractionation.

Accordingly, in one example, the target density can be defined based on the evaporation characteristics of the liquid, and in particular in order to maximize an amount of evaporation for a given amount of combustion, or to allow different salts to be separately extracted from a liquid solution.

In one example, the target density is determined by geochemical modelling, bench studies or during a commissioning process. In particular, the combustion apparatus is operated so that the solution concentration and hence density progressively increase. During this process, the evaporation rate and density of fluid are measured by the controller 160 using signals from the level and density sensors 151, 152. This can be used to identify the density, and hence concentration, at which the maximum rate of evaporation is observed, or to determine the concentration or temperature at which particular salts precipitate, allowing these to be used as target operating parameters. Additionally and/or alternatively to performing this during commissioning, determination of target operating parameters can be performed based on a theoretical analysis or modelling of the constituents of the liquid, and operating conditions, such as the ambient air pressure and/or temperature.

Figure 2B:
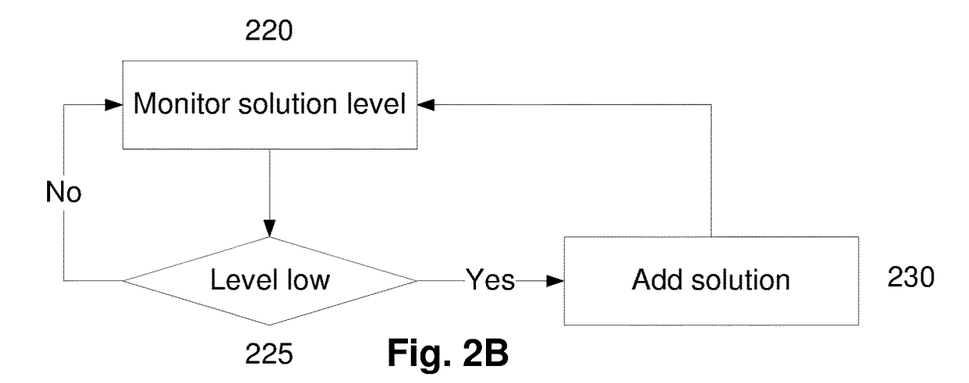
FIG. 2B is a flowchart of an example of an inflow control process for a submerged combustion apparatus.

In terms of the inflow of liquid, this is typically performed in order to maintain a desired liquid level within the vessel, as will now be described with reference to FIG. 2B.

In this example, at step 220 the controller 160 monitors a liquid level using signals from the level sensor 151. The controller 160 compares the measured level to a target level to determine if the liquid level is low at step 225. If the liquid level is low, then at step 230, the controller causes liquid to be supplied to the inlet 112, for example by energizing a suitable pump or the like, as will be described in more detail below. A predetermined amount of liquid can be added, or alternatively solution can be added until the liquid level reaches an upper limit, or at a predetermined rate. In either case, this approach is repeated continuously, allowing the liquid levels to be maintained to counteract the removal of liquid concentrate and vaporization of liquid.

It will be appreciated however that alternative inflow and outflow control strategies could be used. For example, inflow control could be performed based on a liquid evaporation rate with outflow being controlled so as to maintain desired liquid levels in the liquid vessel. Irrespective of the approach used, desired inflow and outflow rates could be determined through measurement during a commissioning process, through active feedback during operation of the combustion apparatus and/or through modelling of operation prior to use.

In terms of burner operation, the ability to control this will depend on the nature of the burner, but typically it is possible to control aspects of operation, such as the air/fuel ratio (AFR), and the amount of excess air in which the AFR is burned. In this regard, the efficiency of the burning will depend on factors such as ambient conditions, including barometric pressure, as well as the nature of the fuel, or the like. In one example, control is performed at least partially based on $O_2$ levels in combustion products, as will now be described with reference to FIG. 2C, although it will be appreciated that alternatively a temperature within the combustion chamber could be used in a similar manner.

Figure 2C:
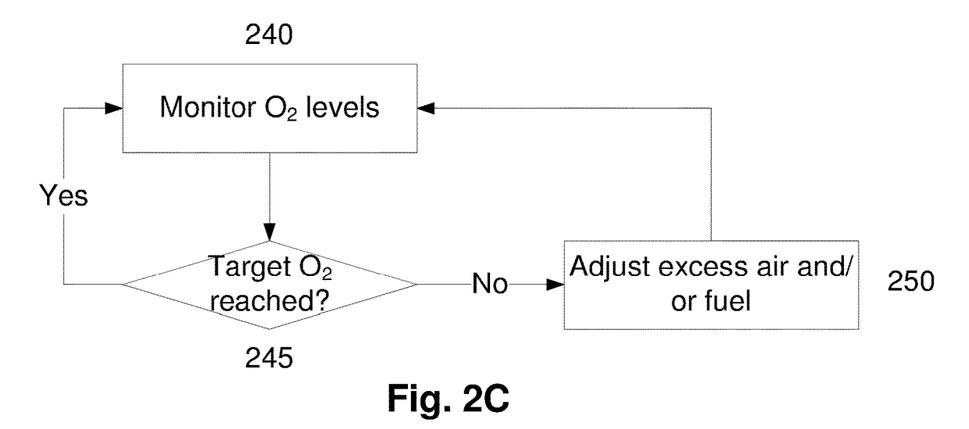
FIG. 2C is a flowchart of an example of a combustion control process for a submerged combustion apparatus.

In this example, at step 240 the controller 160 monitors $O_2$ levels in the gaseous combustion products in accordance with signals from the $O_2$ sensor. This is performed to determine if a target $O_2$ level has been reached at step 245, and if not the amount of pressurized air provided from the air supply and/or fuel from the fuel supply, can be adjusted at step 250. This is performed in order to optimize the burning of the fuel, and hence the temperature and volume of the gaseous combustion products produced.

Alternatively, this can be performed during a commissioning process, for example by monitoring the amount of evaporation achieved for an amount of fuel used/air supplied. In this case, the density of the solution would be maintained at a constant amount by draining liquid concentrate, adding liquid to maintain liquid levels, and measuring the difference between the liquid concentrate removed and the amount of liquid added to determine an amount of evaporation. This can be used to determine the preferred air-fuel mixture and amount of excess air, as required to vaporize solution at a rate suited to the project requirements.

In the above described example, operation of the burner is described with respect to the provision of air. However, it will be appreciated that $O_2$ could be supplied instead of or in addition to air, in order to further aid combustion. This will typically depend on the requirements of the fuel being burned, which could include fuel oil, methane, natural gas, LPG or the like. In one example, the provision of additional $O_2$ is particularly beneficial when a variable gas supply is used to supply the burner as with landfill gas or gas diverted from flare stacks at oil and gas sites.

Figure 3A:
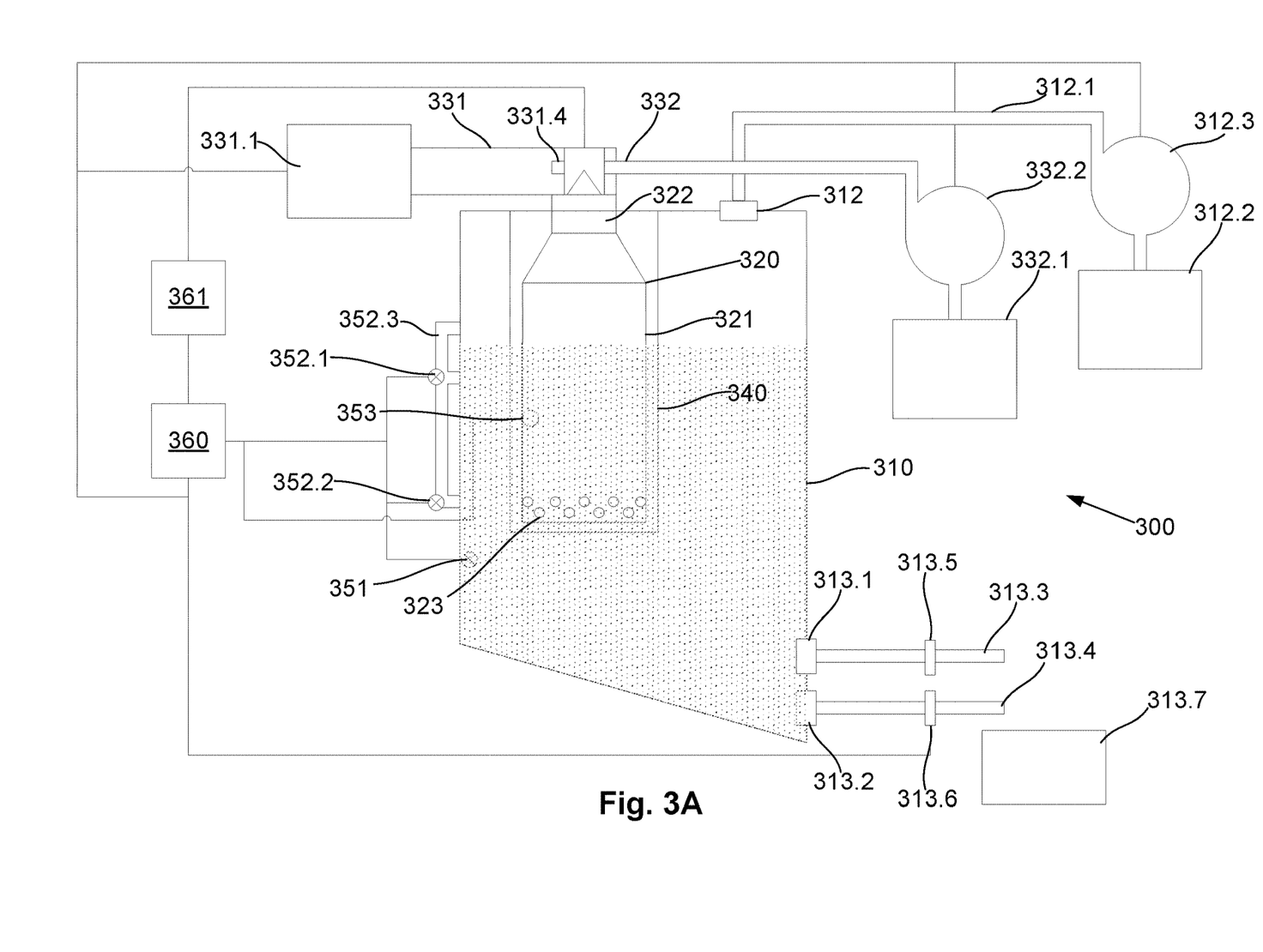
FIG. 3A is a schematic side view of a specific example of a submerged combustion apparatus.
Figure 3B:
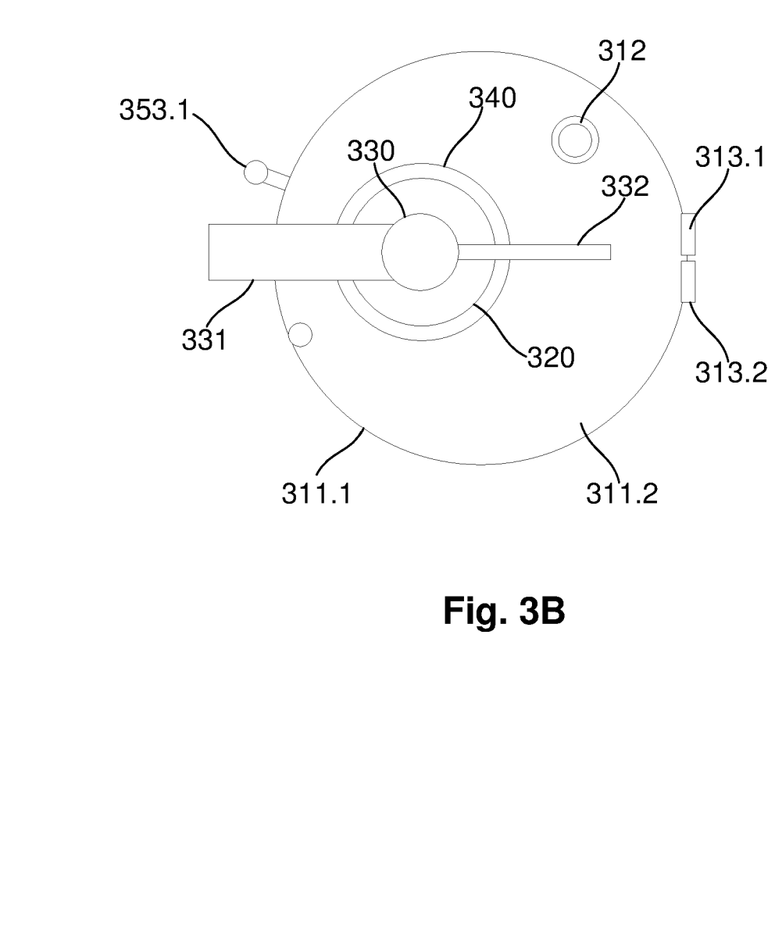
FIG. 3B is a schematic plan view of the liquid vessel of FIG. 3A.
Figure 3C:
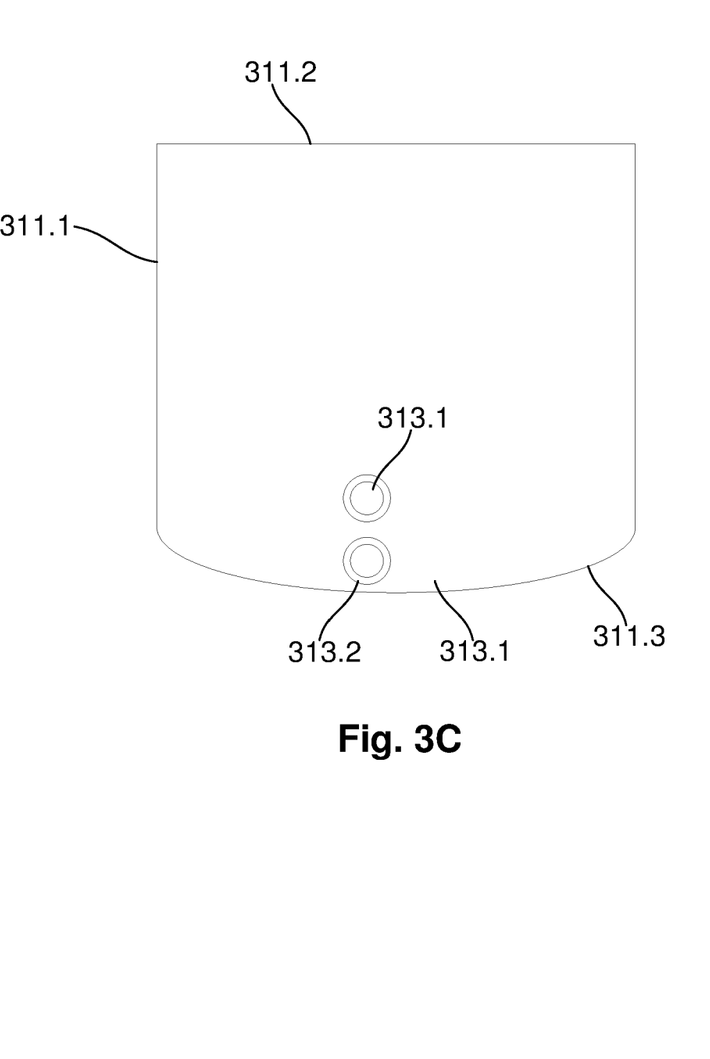
FIG. 3C is a schematic end view of the liquid vessel of FIG. 3A.

A number of further features of a specific arrangement will now be described with reference to specific examples of FIGS. 3A and 3B. In this example, similar reference numerals are used to refer to similar features to those shown in FIGS. 1A and 1B, albeit increased by 200.

Accordingly, the submerged combustion apparatus 300 includes a liquid vessel 310 having vessel side walls 311.1 extending between a vessel lid 311.2 and vessel base 311.3. In this example the vessel body has a generally cylindrical shape, with a vessel base 311.3 that is sloped and curved so as to define a funnel extending to the outlets 313, which is provided proximate a lower edge of the side wall 311.1, adjacent a low point of the vessel base. Low and high flow outlets 313.1, 313.2 are provided to allow outflow of liquid, via respective outlet pipes 313.3, 313.4 to an outlet receptacle 313.7, such as a precipitation bin or liquid reservoir. An outlet valve 313.5, 313.6, can be provided for each outlet, with the outlet valve being coupled to controller 360, allowing operation of the outlet valve and hence outflow of liquid, to be controlled. In use, the low flow outlet is typically used for outflow of liquid during operation, whilst the high flow outlet is used for draining the liquid vessel, although it will be appreciated that this is not essential and any suitable outlet arrangement could be used.

The liquid vessel 310 includes a vessel inlet 312 that is coupled via a connecting pipe 312.1 to a liquid reservoir 312.2. A pump 312.3 is provided for pumping water from the liquid reservoir 312.2, with the pump being coupled to the controller 360, allowing operation of the pump to be controlled.

The combustion apparatus 300 also includes a combustion chamber 320 having a combustion chamber body 321 having an inlet 322 provided proximate a first end and a plurality of discharge ports 323, similar in form to the combustion chamber 120 described above, positioned in the liquid vessel 310 so that at least the discharge ports 323 are submerged in liquid in use. A baffle 340 again surrounds the combustion chamber 320 to provide a guide surface, although as previously described this could alternatively be achieved through appropriate configuration of the vessel side walls.

A burner 330 is coupled to an inlet of the combustion chamber and coupled to an air supply via an air supply conduit 331. The air supply could include a blower 331.1 coupled to a motor, which provides air to an air inlet 331.4 of the burner, allowing air to be mixed with fuel prior to combustion, with the remaining excess air being diverted around the burner into the combustion chamber. This is used to pressurize the combustion chamber evacuating liquid and allowing the air/fuel mixture to be burned therein, as will be appreciated by persons skilled in the art.

The burner further includes a fuel inlet 332, coupled to a fuel source 332.1, via a fuel pump 332.2. The fuel source and fuel pump can be of any appropriate form depending on the nature of the fuel to be supplied, which could include any liquid and/or gaseous fuel, such as fuel oil, methane, natural gas, LPG, or the like, and may include nozzles for atomizing liquid fuel, as required. Additionally, multiple different fuel supplies could be provided, with these being selectively coupled to the fuel inlet 332 as required. The burner is also typically coupled to a pilot light fuel source, such as an LPG supply or the like.

Actuation of the burner 330, is independently controlled by a burner control unit 361, which controls the flame ignition and associated safety aspects independent of the controller 360. The burner control unit 361 is coupled to the controller 360, and ensures that required operating parameters are met before the burner is ignited. In particular, this requires that the air supply is active and the combustion chamber substantially evacuated before the pilot flame is ignited. Only once this has been completed successfully is the pilot system lit, fuel pump activated and subsequent combustion allowed to commence.

In this example, the apparatus 300 includes a level sensor in the form of a pressure transmitter 351, coupled to the controller 360 positioned either within or outside of the liquid vessel, which allows a depth of liquid to be monitored. In this example, a single sensor is shown, with this being used to calculate a depth based on the density of the fluid (calculated as described below), although this is not essential and other arrangements, such as other forms of sensor, or multiple sensors could be used in order to sense the depth of the liquid.

Additionally, the apparatus includes a density sensor (or meter) including a substantially vertical pipe 352.3 containing first and second pressure sensors 352.1 and 352.2 provided at different heights within the pipe. The pipe is provided in fluid communication with the internal volume of the liquid vessel at two different levels. A difference in the pressure sensed by the pressure sensors 352.1 and 352.2, when solution is pumped through the density sensor, can be used by the controller 360 in order to calculate a liquid density using a suitable algorithm, which can in turn be used as a surrogate measure of the liquid solution concentration. In practice, this senses a pressure head and relates this to the fluid level. As the solution becomes more dense, the liquid level is adjusted lower thus maintaining the same amount of backpressure required by the blower.

It will be appreciated that the apparatus functions in a manner similar to that described above, with the controller 360 operating to sense signals from the level and density sensors 351, 352.1, 352.2, and use this to control the inflow and outflow rates by controlling the feed pump 312.3 and the outlet valves 313.5 or 313.6. Additionally, the controller 360 can use signals from the $O_2$ sensor 353 to control the air supply 331.1 and fuel pump 332.2, to thereby adjust the AFR, and excess air, thereby controlling the combustion process.

The apparatus can also include a foam sensor (not shown), such as a pressure transmitter or manometer connected to the vessel head space, for sensing a degree of foaming of the liquid in the vessel. An anti-foaming agent can then be added by the controller 360 in the event that a degree of foaming exceeds an acceptable amount. The application of anti-foam agent can be performed manually or automatically.

The apparatus 300 can be mounted on a common base frame (not shown), such as a vehicle trailer, which may also be optionally provided with a power supply, such as a generator, and fuel supply. This arrangement is particularly advantageous as it allows the submerged combustion apparatus to be provided in an easily portable configuration, allowing this to be transported to a site, used and then removed after use. However, it will be appreciated that this is not essential and other configurations, such as static configuration, or the use of remote fuel and power sources, could be used.

In one example, the apparatus can be provided in a modular arrangement. In this example, multiple vessels, combustion chambers and burners are provided, independently coupled to common liquid sources and concentrate receptacles. In use, fuel and air can then be supplied to the burners via a common manifold, with the inflow and outflow of liquid from each vessel being independently controlled using a single common controller, based on signals from respective sets of sensors. It will be appreciated that this reduces the need for control systems and respective air and fuel supplies, whilst allowing for an increased throughput of liquid.

A number of further features will now be described with reference to an example usage scenario. In particular, for the purpose of the following example the submerged combustion apparatus is used to concentrate saline waters to the point of saturation at which point salts will settle out, precipitate and crystallize. These waters will typically be derived from ponds or brine concentrate from reverse osmosis plants, mining applications or the like.

The treated waters would typically have a beginning salt concentration similar to that of seawater—about 35,000 mg/L. The submerged combustion apparatus then concentrates the water to approximately 300,000 mg/L. Then the hot water is discharged by gravity into a precipitation bin where it precipitates and forms a solid material which is later chemically stabilized for sale, re-use or disposal.

However, the solution need not be precipitated, depending on the project requirements. In some cases the vessel water is continually replenished to maintain the vessel 310 level within set limits and continually evaporate the solution whilst keeping the density and hence concentration constant.

The operational process typically includes having water solution pumped from a pond or other source into a feed vessel 312.2, as required. From the feed vessel, the water is then introduced into the vessel 310, via a feed pump 312.3, which could be mounted upon the base frame. A constant water level is maintained in the vessel 310 by the utilization of the level sensor 351 (pressure transmitter). Hot combustion gases from the burner 330 are bubbled through the solution via the discharge ports 323 in the combustion chamber 320. The burner is fueled with either fuel oil, methane, natural gas or LPG, depending on the fuel available.

In one example, an industrial blower acts to provide combustion air which acts as a carrier of the hot combustion gases and displaces fluid in the combustion chamber. These pass through and around the downward facing burner into the combustion chamber 320, which is submerged beneath the water surface inside the vessel 310. The combustion chamber is surrounded by a vertical baffle 340, which acts to constrain the flow of bubbles, which in turn reduces vibrations, hence stabilizing the machine and cools and protects the combustion chamber by forcing solution in a vertical direction upwards along the outside surface of the combustion chamber. Water vapor escapes, with this being released into the atmosphere through exhaust stacks provided in the vessel lid.

In one example, the blower fan is controlled by a variable speed drive (VSD) which maintains a constant flow of air into the combustion chamber. The PLC controller 360 controls the Air/Fuel Ratio (AFR) when in AFR automation mode by adjusting the fuel to achieve a set point AFR once the optimal combustion air flow is set, thereby controlling the combustion process automatically. The Air Fuel Equivalency Ratio (AFER) indicates the excess air fed into the burner head for combustion and is monitored during project commissioning in order to determine the set point AFR to achieve the desired AFER and maximize evaporation.

The water is concentrated in the vessel 310 to a target concentration and the hot solution is dumped into a precipitation bin 313.2. The target concentration can be estimated through suitable analysis of the liquid and geochemical modelling, defined by site requirements, or ascertained during a commissioning process, and is typically measured in practice by measuring the liquid density using the density sensor 352.

Once the concentrated solution is dumped into the precipitation bin 313.2 it cools and the salts settle, precipitate and crystallize. Supernatant solution is formed in the precipitation bin 313.2 as the salt solidifies, which can then be pumped into the feed vessel or directly into to the vessel 310 by means of a portable pump to either further concentrate the solution or flush the concentration vessel. The volume of feed water introduced to the vessel 310 is metered as is the return supernatant water in order to accurately track the rate of evaporation.

Continuous low flow release from the vessel 310 can be adopted in order to maintain the concentration and maximize evaporation, thereby increasing the concentration cycle time.

The on-board feed pump 312.3 is designed to fill the vessel 310 and to maintain the desired level with the pump being controlled by the controller 360 based on signals from the level sensor 351.

The blower-burner system is activated according to a pre-programmed process which involves the air supply purging the combustion chamber prior to ignition of the burner.

If the burner uses an oil fuel, oil from the fuel storage vessel 332.1 will be fed via plumbing directly to the supply oil pumps. Either of two redundant oil pumps 332.2 will supply fuel to the burner, and an air compressor will feed air to the burner to aspirate the fuel oil. If the system operates on natural gas, the gas will be supplied to a port having an isolation valve. The gas then moves through the gas train with filters, flow sensors, pressure regulating valves, block valves, a leak detection unit and visual pressure gauges all forming part of the gas train. The gas pressure is regulated down in order to proceed to the burner head at the required pressure to overcome blower combustion air pressure and enter the burner head.

The Burner Control Unit (BCU) 361 manages operation of the burner and there are several PLC permissives as well as BCU safety permissives that must be met before the submerged combustion apparatus will start correctly.

As the vessel 310 water level drops due to evaporation, the controller activates the feed pump 312.3, which maintains the desired operational level inside the vessel 310. The controller 360 can monitor the inflow of liquid from the pump 312.3 and compare this to measured levels within the vessel 310 to ensure these match.

In case the vessel 310 level drops to a low level that threatens the integrity of the vessel lining and combustion chamber from excessive heat then the controller 360 is typically adapted through an independent circuit to shut down the burner 330 to prevent damage. In the event the vessel 310 is overfilled the controller 360 can override the system through an independent circuit and prevent overflow.

Additionally, the controller 360 can be adapted to monitor burner temperature and air pressure in the blower air delivery tube 331. As solution density increases within the vessel 310 it is generally necessary to adjust the air supply to maintain air flow through the combustion chamber and hence the desired evaporation rate. For some projects, the blower may be operating at full capacity from project commencement.

When solution is to be purged from the vessel 310, the outlet valve 313.6 is opened to release the concentrated brine.

Accordingly, the above described submerged combustion apparatus arrangements can reduce the volume of and concentrate water that is normally sourced from industrial process ponds or brine concentrate out of reverse osmosis plants. The apparatus employs submerged combustion technology that forces hot combustion gas into a liquid, thereby vaporizing the liquid to concentrate water to either a desired concentration and/or to a point of saturation where salts precipitate and fall out of solution.

The apparatus can utilize a control process for controlling the Air/Fuel ratio (AFR), excess air or Air/Fuel Equivalency Ratio (AFER), using an $O_2$ sensor to measure excess air from submerged combustion process in exhaust gases and then tune the supply of air and/or fuel to the burner and hence control an Evaporation/Fuel ratio (EFR), and the Energy Water Equivalence Ratio (EWER).

The system can use level sensors, for example by using one or more pressure transmitters, in order to control the inflow of liquid and thereby maintain a desired liquid level in the vessel. A density measuring sensor system can also be provided to monitor the density, which is indicative of the concentration of the solution allowing for outflow control. This in turn allows for continuous low flow release from the vessel in order to maintain density and maximize evaporation.

The shape and slope of the floor of the vessel, together with the outlet location can assist for effective draining of high concentration liquid concentrate, allowing the system to be run in a continuous manner, as well as allowing for easy maintenance, for example by allowing precipitate to be easily flushed from the vessel.

The provision of a guide surface, such as a baffle surrounding the combustion chamber can help achieve stabilization of the apparatus as well as protect the integrity of the combustion chamber by providing the flow of vapor bubble and cooler solution over the combustion chamber.

The combustion chamber can be provided with an arrangement of discharge ports, having different numbers, sizes, shapes and orientation of holes in order to provide desired bubble characteristics, which can in turn help ensure maximum effectiveness in terms of the ability of the bubbles to vaporize the liquid in the vessel.

The system can also utilize a blower to provide an air supply to the burner, with multiple burners being connected to a single air supply via a manifold arrangement.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A submerged combustion apparatus for heating a liquid, the apparatus including:
   a) a liquid vessel that contains the liquid, the liquid vessel having:
      i) a vessel inlet that receives the liquid from a liquid supply; and,
      ii) a vessel outlet that discharges a concentrated liquid and any precipitates;
   b) a combustion chamber including:
      i) a combustion chamber body;
      ii) an inlet proximate a first end of the combustion chamber body; and
      iii) a plurality of discharge ports proximate a second end of the combustion chamber body, wherein the combustion chamber body is positioned in the liquid vessel so that at least the discharge ports are submerged in the liquid in use;
   c) a burner having:
      i) a burner air inlet that receives pressurized air from an air supply;
      ii) a fuel inlet that receives a fuel from a fuel supply; and,
      iii) a burner outlet in fluid communication with the combustion chamber allowing an air/fuel mixture to be burned at least partially within the combustion chamber thereby causing bubbles of heated gaseous combustion products to be emitted from the plurality of discharge ports so as to heat the liquid;
   d) a level sensor that senses a level of the liquid in the liquid vessel and an O2 sensor that senses an O2 level in the gaseous combustion products, and at least one sensor that senses an additional operating parameter; and,
   e) a controller that in use at least partially controls operation of the apparatus in accordance with the sensed level of the liquid and the sensed O2 level and the at least one additional operating parameter,
   wherein the liquid vessel includes a sloped base surface defining a sump and wherein the vessel outlet is proximate the sump so as to facilitate removal of the concentrated liquid and any precipitates, wherein the vessel outlet is positioned in a substantially vertical face of the sloped base so that the concentrated liquid and any precipitates flow into the vessel outlet in a direction substantially perpendicular to a plane of the vessel outlet.

2. The apparatus according to claim 1, wherein the sloped base surface:
   a) is shaped or curved toward the centre of the vessel so as to funnel any precipitates to the vessel outlet in the direction substantially perpendicular to a plane of the vessel outlet; and
   b) slopes downwardly from under the combustion chamber to the vessel outlet to thereby induce a flow of the concentrated liquid and any precipitates from a region under the combustion chamber towards the vessel outlet.

3. The apparatus according to claim 1, wherein the vessel outlet includes an outlet valve to control a flow of the concentrated liquid and any precipitates from the liquid vessel.

4. A submerged combustion apparatus for heating a liquid, the apparatus including:
   a) a liquid vessel that contains the liquid, the liquid vessel having:
      i) a vessel inlet that receives the liquid from a liquid supply; and,
      ii) a vessel outlet that supplies a concentrated liquid and any precipitates;
   b) a combustion chamber including:
      i) a combustion chamber body;
      ii) an inlet proximate a first end of the combustion chamber body; and
      iii) one or more openings proximate a second end of the combustion chamber body;
   c) a discharge port member mounted proximate the second end of the combustion chamber body so as to cover the one or more openings, the discharge port member including a number of apertures in fluid communication with the one or more openings to define a plurality of discharge ports and wherein the combustion chamber body is positioned in the liquid vessel so that at least the discharge ports are submerged in the liquid in use, wherein the discharge port member is a discharge port band and wherein at least one of:
      i) the discharge port band extends circumferentially around a combustion chamber outer surface proximate the second end; and,
      ii) the discharge port band is clamped into engagement with the combustion chamber body; and,
   d) a burner having:
      i) a burner air inlet that receives pressurized air from an air supply;
      ii) a fuel inlet that receives a fuel from a fuel supply; and,
      iii) a burner outlet in fluid communication with the combustion chamber allowing an air/fuel mixture to be burned at least partially within the combustion chamber thereby causing bubbles of heated gaseous combustion products to be emitted from the plurality of discharge ports so as to heat the liquid.

5. A submerged combustion apparatus for heating a liquid, the apparatus including:
   a) a liquid vessel that contains the liquid, the liquid vessel having:
      i) a vessel inlet that receives the liquid from a liquid supply; and,
      ii) a vessel outlet that discharges a concentrated liquid and any precipitates;
   b) a combustion chamber including:
      i) a combustion chamber body;
      ii) an inlet proximate a first end of the combustion chamber body; and
      iii) a plurality of discharge ports proximate a second end of the combustion chamber body, wherein the combustion chamber body is positioned in the liquid vessel so that at least the outlet discharge ports are submerged in the liquid in use;
   c) a burner having:
      i) a burner air inlet that receives pressurized air from an air supply;
      ii) a fuel inlet that receives a fuel from a fuel supply; and,
      iii) a burner outlet in fluid communication with the combustion chamber allowing an air/fuel mixture to be burned at least partially within the combustion chamber thereby causing bubbles of heated gaseous combustion products to be emitted from the plurality of discharge ports so as to heat the liquid;
   d) a level sensor that senses a level of the liquid in the liquid vessel and an $O_2$ sensor that senses an $O_2$ level in the gaseous combustion products, and at least one sensor that senses an additional operating parameter; and,
   e) a controller that in use at least partially controls operation of the apparatus in accordance with the sensed level of the liquid and the sensed $O_2$ level and the at least one additional operating parameter.

6. The apparatus according to claim 5, wherein the at least one additional sensor includes at least one of:
   a) a density sensor that senses a density of the liquid in the liquid vessel;
   b) a temperature sensor that senses a temperature of the liquid in the liquid vessel; and
   c) a temperature sensor that senses a combustion exhaust temperature.

7. The apparatus according to claim 5, wherein the level sensor includes two pressure sensors, and wherein the controller determines a liquid level based on a pressure sensed by the pressure sensors.

8. The apparatus according to claim 5, wherein the controller controls at least one of:
   a) an inflow rate of the liquid into the liquid vessel;
   b) an outflow rate of the concentrated liquid and any precipitates;
   c) an outflow rate of the concentrated liquid to maintain a target liquid density; and,
   d) an inflow rate of the liquid to maintain a target liquid level.

9. The apparatus according to claim 5, wherein the controller controls a degree of combustion by controlling at least one of:
   a) a pressurized air inflow rate;
   b) a fuel inflow rate; and,
   c) an air/fuel mixture ratio (AFR); and,
wherein the controller is capable of applying at least one of the following processes:
   a) a modulation of air and fuel inflow using valves;
   b) a calibration process for instantaneous air and fuel inflow rate adjustment;
   c) a measuring of air/fuel equivalency ratio (AFER) or excess air from the $O_2$ sensor; and,
   d) a sensing of temperature in the combustion chamber.

10. The apparatus according to claim 5, wherein the controller controls the apparatus to provide substantially continuous operation.

11. The apparatus according to claim 10, wherein the controller controls an inflow rate of the liquid into the liquid vessel in accordance with an outflow rate of the concentrated liquid and a rate of vaporization of the liquid in the liquid vessel.

12. A method of using a submerged combustion apparatus to heat a liquid, the apparatus including:
- a) a liquid vessel that contains the liquid, the liquid vessel having:
  - i) a vessel inlet that receives the liquid from a liquid supply; and,
  - ii) a vessel outlet that discharges a concentrated liquid and any precipitates;
- b) a combustion chamber including:
  - i) a combustion chamber body;
  - ii) an inlet proximate a first end of the combustion chamber body; and
  - iii) a plurality of discharge ports proximate a second end of the combustion chamber body, wherein the combustion chamber body is positioned in the liquid vessel so that at least the discharge ports are submerged in the liquid in use;
- c) a burner having:
  - i) a burner air inlet that receives pressurized air from an air supply;
  - ii) a fuel inlet that receives a fuel from a fuel supply; and,
  - iii) a burner outlet in fluid communication with the combustion chamber allowing an air/fuel mixture to be burned at least partially within the combustion chamber thereby causing bubbles of heated gaseous combustion products to be emitted from the plurality of discharge ports so as to heat the liquid;
- d) a level sensor that senses a level of the liquid in the liquid vessel and an O2 sensor that senses an O2 level in the gaseous combustion products, and at least one sensor that senses an additional operating parameter; and,
- e) a controller that in use at least partially controls operation of the apparatus in accordance with the sensed level of the liquid and the sensed O2 level and the at least one additional operating parameter, wherein the liquid vessel includes a sloped base surface defining a sump and wherein the vessel outlet is proximate the sump so as to facilitate removal of the concentrated liquid and any precipitates, wherein the vessel outlet is positioned in a substantially vertical face of the sloped base so that the concentrated liquid and any precipitates flow into the vessel outlet in a direction substantially perpendicular to a plane of the vessel outlet, and wherein the method includes the steps of using the apparatus to:
- i) heat the liquid;
- ii) evaporate the liquid;
- iii) concentrate the liquid; and,
- iv) volatilize targeted chemical constituents.

* * * * *